United States Patent [19]

Schlamadinger

[11] Patent Number: 5,159,815
[45] Date of Patent: Nov. 3, 1992

[54] TURBOCHARGED INTERNAL COMBUSTION ENGINE

[75] Inventor: Hans J. Schlamadinger, Columbus, Ind.

[73] Assignee: Cummins Engine Company, Columbus, Ind.

[21] Appl. No.: 730,218

[22] Filed: Jul. 15, 1991

[51] Int. Cl.⁵ .................. F02B 37/12; F02D 23/02
[52] U.S. Cl. .................................. 60/603; 123/383
[58] Field of Search .................. 60/601, 602, 603; 123/383

[56] References Cited

U.S. PATENT DOCUMENTS 4,512,152  4/1985  Asaba ........................ 123/383 X

FOREIGN PATENT DOCUMENTS 3307265  9/1984  Fed. Rep. of Germany ...... 123/383
41429    4/1981  Japan ......................... 123/383
781382  11/1980  U.S.S.R. ...................... 60/603

*Primary Examiner*—Michael Koczo
*Attorney, Agent, or Firm*—Woodard, Emhardt, Naughton, Moriarty & McNett

[57] ABSTRACT

A turbocharger for an internal combustion engine is provided having a turbine section responsive to the engine exhaust gas flow and a compressor section communicating with the engine intake manifold. A pressure responsive adjustable fuel pump is in communication with the engine combustion chambers. A wastegate unit with an adjustable valve disposed within a bypass passageway formed in the turbine section is provided for regulating the diverion of a predetermined amount of exhaust gas flow away from a turbine wheel within the section. The unit valve is biased to assume a closed position with respect to the bypass passageway. A multiport connection having an interior cavity is provided with a first port in pressure communication with the fuel pump; a second port in pressure communication with the intake manifold; and a third port in pressure communication with the wastegate unit. When pressure within the connection cavity is below a predetermined amount, the bias on the unit adjustable valve will close the secondary passageway and the fuel pump responsive to the reduced cavity pressure reduces the fuel flow to the engine and the speed of the turbocharger turbine wheel.

7 Claims, 2 Drawing Sheets

TURBOCHARGED INTERNAL COMBUSTION ENGINE

BACKGROUND OF THE INVENTION

Overspeeding of a wastegate type turbocharger is to be avoided so as to prevent severe engine damage. Failure of the wastegate unit is frequently due to a leakage in either the boost sensing line or the diaphragm of the unit causing in either instance the unit to normally assume a closed position without regulating the fuel flow and thus, the rapid buildup of excessive cylinder pressure due to overspeeding of turbocharger rotors. Various preventive systems against turbocharger overspeeding have heretofore been proposed, however, such systems are beset with one or more of the following shortcomings; a) costly and complex components are utilized; b) the system is prone to frequent malfunction; c) it is difficult to service and/or install; and d) it requires substantial modifications to be made to certain of the engine components.

SUMMARY OF THE INVENTION

Thus, an improved wastegate type of turbocharged internal combustion engine has been provided which avoids all of the aforenoted shortcomings.

With the improved engine, any failure due to leakage in either the wastegate boost sensing line or diaphragm, causes a reduction in the fuel flow to the engine cylinders. Such reduced fuel flow adversely affects the power output of the engine thereby providing incentive to operating personnel to remedy the wastegate problem before any progressive serious engine damage occurs.

In accordance with one embodiment of the invention a turbocharged internal combustion engine is provided which utilizes a pressure responsive wastegate unit having an adjustable valve for regulating the exhaust gas flow to the turbine section of the turbocharger. The unit is in pressure communication with a port leading to an interior cavity formed in a multiport connection. A second port to the connection cavity is in pressure communication with the engine intake manifold. A third port to the cavity is in pressure communication with a fuel feed means for the engine. The wastegate unit adjustable valve is biased to assume a closed position blocking bypass flow of the exhaust gas around the turbine section of the turbocharger. The bias pressure on the unit adjustable valve is in opposition to the pressure maintained within the connection cavity. Thus, when the pressure within the cavity is below the bias pressure, the adjustable valve will assume the closed position causing the pressure imposed on the fuel feed means through the third port to be reduced resulting in the fuel fed to the engine cylinders to be reduced preventing overspeeding of the turbocharger rotors (e.g., turbine and compressor wheels).

DESCRIPTION OF THE DRAWINGS

For a more complete understanding of the invention reference is made to the drawings wherein.

DESCRIPTION

Figure 1:
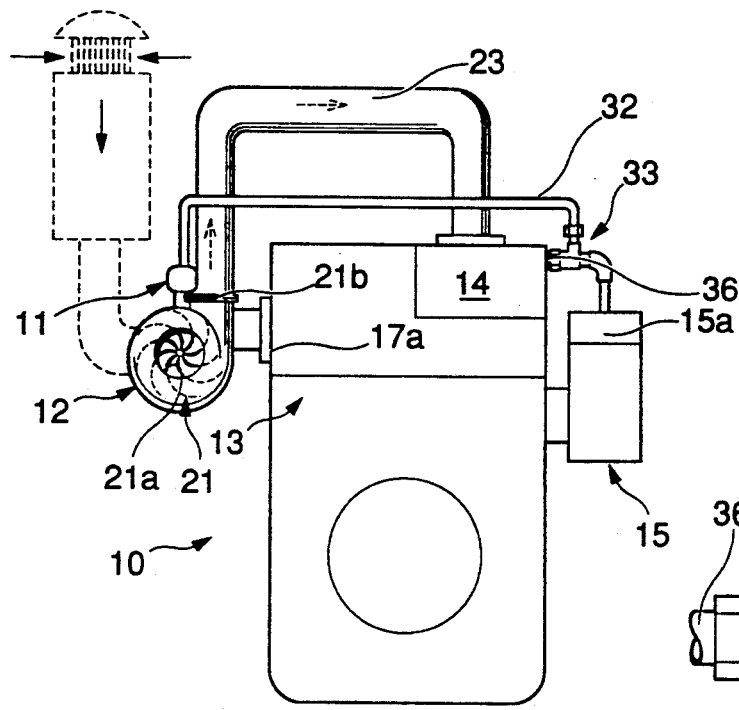
FIG. 1 is a schematic representation of one embodiment of the improved turbocharged internal combustion engine.

Referring now to the drawings and more particularly to FIG. 1, one embodiment of a turbocharged internal combustion engine 10 is shown which utilizes a wastegate unit 11 in combination with a turbocharger 12, sometimes referred to as a wastegate type. The engine 10 includes a cylinder block and head combination 13 of conventional design; an air intake manifold 14 in communication with engine combustion chambers, not shown, formed in the cylinder head; and a fuel feed means (pump) 15 also in communication with the combustion chambers. The pump 15 is provided with a pressure sensitive control 15a which regulates the fuel flow from the pump to the combustion chambers.

Figure 4:
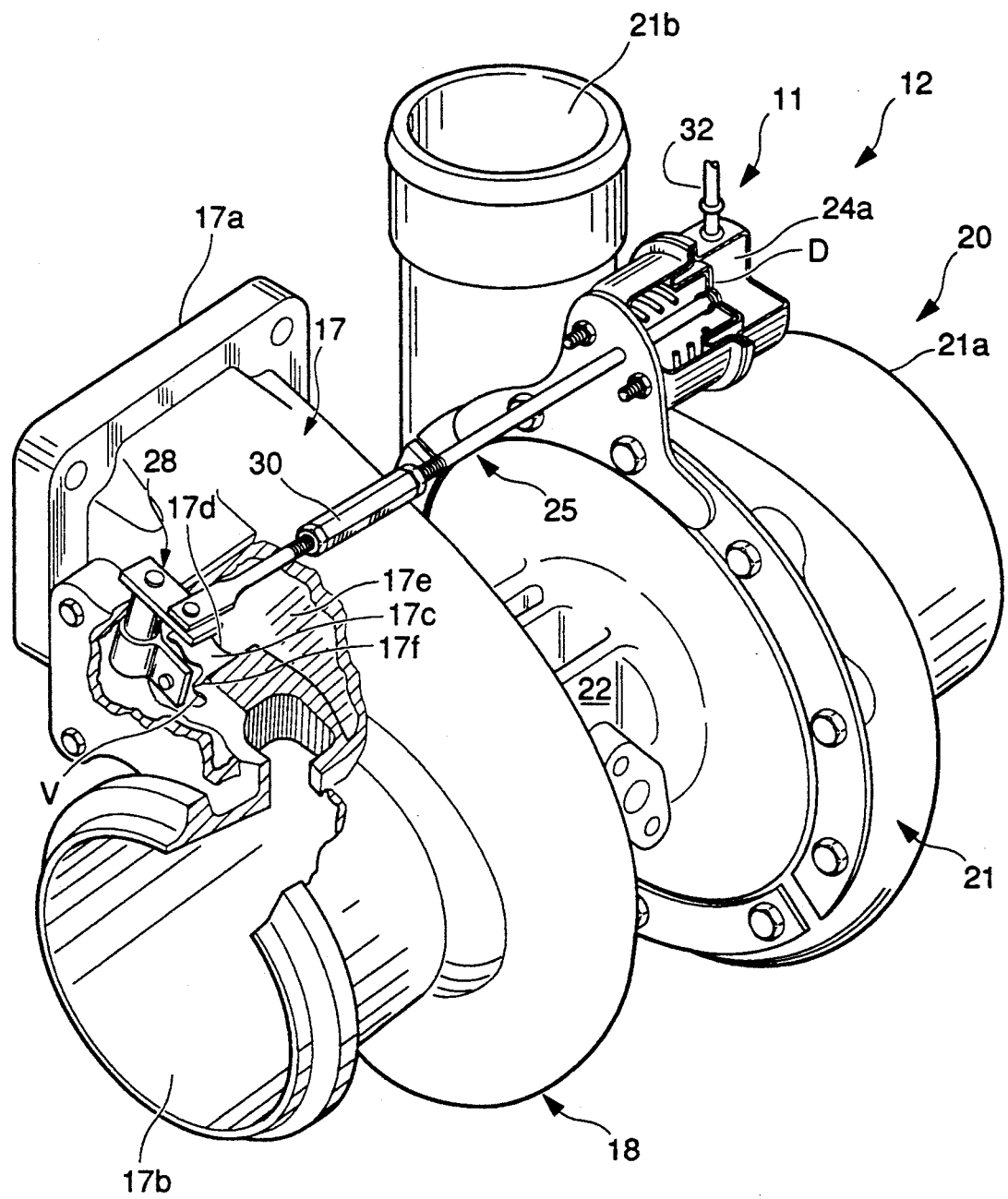
FIG. 4 is an enlarged fragmentary perspective view of the turbocharger of FIG. 1 shown with the wastegate unit mounted thereon; segments of the unit and turbocharger being removed so as to expose interior portions thereof.

Each combustion chamber may be of conventional design and includes intake and exhaust valves which open and close in a timed sequence with the stroke of a corresponding piston. The exhaust gases generated in each combustion chamber and corresponding cylinder flow into an exhaust manifold, not shown. From the exhaust manifold the exhaust gases are directed to an intake side 17a of a housing 17 forming a component of the turbocharger turbine section 18, see FIG. 4. From the intake side 17a, the exhaust gases flow through an interior primary passageway 17e to a turbine wheel (rotor) not shown, which is rotatably mounted within the housing 17. From the turbine wheel the exhaust gases exit through a discharge side 17b of the housing. As seen in FIG. 4, the interior of housing 17 is provided with a bypass, or secondary, passageway 17c which is upstream of the turbine wheel and communicates at one end through port 17d with the primary passageway 17e and at the opposite end through a port 17f with the discharge side 17b, see FIG. 2. When the port 17d is fully open a predetermined amount of the exhaust gases is diverted around the turbine wheel through the secondary passageway 17c to the discharge side 17b. The flow of the exhaust gases through passageway 17c is regulated by an adjustable valve V forming a component of the wastegate unit 11, the latter to be described more fully hereinafter.

As seen in FIG. 4, turbocharger 12 includes a compressor section 20 having a housing 21 in which is disposed a compressor wheel (rotor), not shown. The turbine section housing 17 and the compressor section housing 21 are interconnected by a sleeve 22 through which extends a shaft, not shown, keyed to the turbine and compressor wheels. Housing 21 is provided with an air intake side 21a and a discharge side 21b, the latter being connected via passageway 23 to the engine intake manifold 14, see FIG. 1. If desired, an air/air aftercooler, not shown, may be disposed within passageway 23 between the turbocharger 12 and the intake manifold 14.

Figure 2:
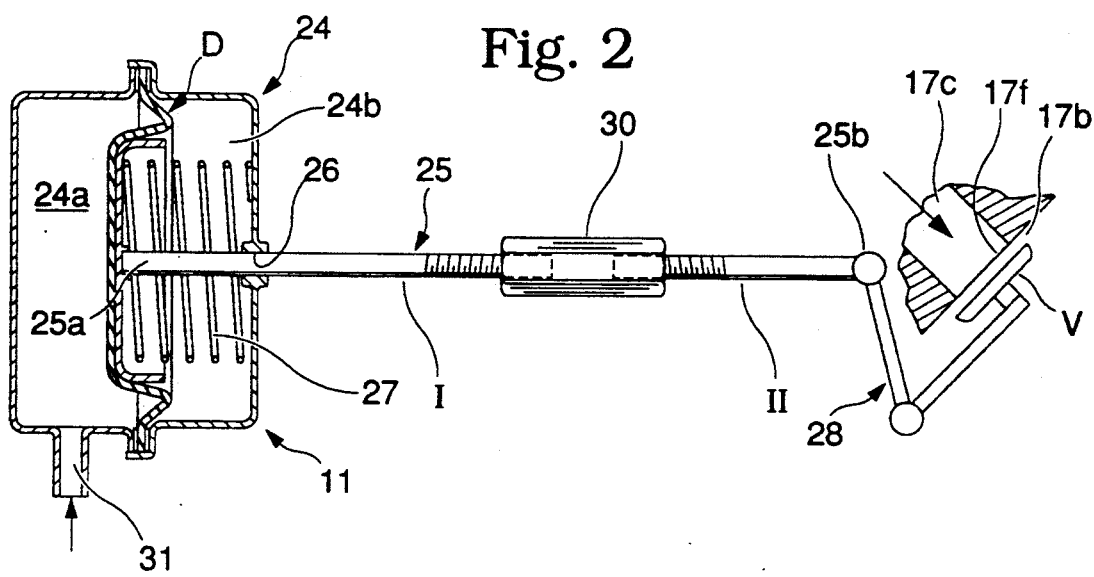
FIG. 2 is an enlarged schematic representation of the wastegate unit per se incorporated in the engine of FIG. 1.

As seen in FIG. 2, the wastegate unit 11 includes a casing 24 in which is mounted a diaphragm D effecting separation of the casing interior into a pair of contiguous chambers 24a, 24b. Secured to the face of diaphragm D, which is adjacent chamber 24b, is one end 25a of a rod 25. The rod 25 slidably extends through an opening 26 formed in the exterior wall of housing 24. Disposed within housing chamber 24b between the diaphragm D and opening 26 is a bias spring 27. The opposite end 25b of the rod is pivotably connected to a linkage assembly 28 which is connected to valve V, see FIG. 2. The rod 25 may be formed of two sections I and II which are interconnected in endwise relation by an internally threaded sleeve 30. Thus, by manually rotating the sleeve 30 the overall length of rod 25 can be adjusted so that valve V will open when the rated speed of the turbocharger has been exceeded. Casing 24 is provided with a port 31 which communicates with interior chamber 24a. Port 31 is connected by tubing 32, sometimes referred to as the boost sensing line, to a multiport connection 33.

Figure 3:
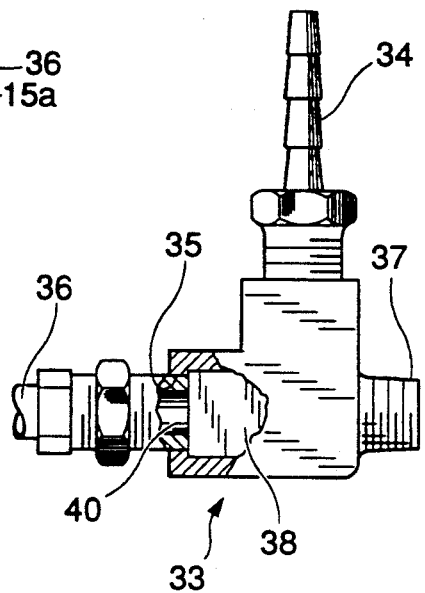
FIG. 3 is an elevational view of the multiport connection per se incorporated in the engine of FIG. 1 with a portion of the connection removed so as to expose the interior cavity formed therein.

As seen in FIG. 3, connection 33 has a first port 34 connected to tubing 32; a second port 35 connected by tubing 36 to the engine intake manifold 14; and a third port 37 connected to a pressure sensitive control unit 15a forming a component of the fuel pump 15. The control unit 15a is of conventional design and is adapted to regulate the flow of fuel from the pump 15 to the various combustion chambers formed in the cylinder head of the engine. All of the ports 34, 35 and 37 communicate with an interior cavity 38 formed in the connection 33, see FIG. 3. By reason of the connection 33, the pressure within the air intake manifold 14 is reflected in cavity 38 which, in turn, determines the pressure within chamber 24a and the setting of the wastegate unit valve V. The pressure within connection cavity 38 is also transmitted to the pump control unit 15a which regulates and the rate of flow of the fuel from the fuel pump. Thus, if there should be a leak in tubing 32 or diaphragm D, the pressure within chamber 24a will be diminished with the result that the reduced pressure imposed on the pump control unit 15a will cause the rate of fuel flow to be automatically reduced causing the turbocharger to operate at a slower speed notwithstanding that the bypass passageway 17c is closed. With the reduced speed of the turbocharger, the power output of the engine is noticeably affected, thus signaling to the engine operator that there is a problem needing attention.

In order to prevent sudden pressure surges from the air intake manifold 14 through tubing 36 to the connection cavity 38, an orifice 40 of a predetermined size may be mounted on port 35 of the connection 33, see FIG. 3. The orifice enables the control unit 15a of the fuel pump to be more responsive to the pressure drop within unit chamber 24a.

Thus, a turbocharged internal combustion engine has been described having a wastegate unit of simple construction which is mounted in such a way as to directly affect the output of the engine fuel pump and prevent overspeeding of the turbocharger when there is a leak in certain components of the unit.

I claim:

1. An internal combustion engine comprising an exhaust gas turbocharger having a turbine section provided with a housing having an interior primary passageway and a secondary passageway, and a turbine wheel within said housing and responsive to the exhaust gas flow through said primary passageway, said secondary passageway effecting bypassing of a predetermined amount of exhaust gas away from said turbine wheel when the engine is in a selected operating mode, and a compressor section having a compressor wheel operatively connected to said turbine wheel and mounted within a housing and in communication with an engine air intake manifold; a pressure responsive adjustable fuel feed means in communication with engine combustion chambers; a pressure responsive wastegate means having an adjustable valve for regulating the exhaust gas flow through the secondary passageway, said valve being biased to a closed position with respect to said secondary passageway; and a multiport connection having an interior cavity with a first port in pressure communication with said wastegate means whereby the pressure within such cavity is in opposition to the valve bias, a second port in pressure communication with said air intake manifold, and a third port in pressure communication with said fuel feed means; when pressure within the cavity is below a predetermined amount, the bias on said adjustable valve overcomes said cavity pressure and effects adjustment of said valve to said closed position, the fuel feed means is directly responsive to the cavity pressure and reduces fuel feed to said engine combustion chambers.

2. The internal combustion engine of claim 1 wherein the wastegate means includes a housing having a diaphragm mounted therein segregating the housing interior into a pair of contiguous chambers, one side of said diaphragm being exposed to the cavity pressure of said connection and a second side of said diaphragm being exposed to an opposing bias pressure, the second side of said diaphragm being operatively connected to the adjustable valve of said wastegate means.

3. The internal combustion engine of claim 2 wherein the diaphragm second side is connected by an elongate element to said adjustable valve.

4. The internal combustion engine of claim 3 wherein the elongate element includes means for selectively adjusting the length thereof.

5. The internal combustion engine of claim 1 wherein the second port of the multiport connection is provided with a pressure limiting orifice.

6. An exhaust gas turbocharger for an interval combustion engine, comprising a turbine section provided with a housing having a primary passageway in which a turbine wheel is mounted, a bypass secondary passageway communicating with said primary passageway upstream of said turbine wheel and a compressor section provided with a compressor wheel operatively connected to said turbine wheel and having a discharge side for connecting to an engine air intake manifold; wastegate means including a pressure responsive adjustable valve for regulating exhaust gas flow through the secondary passageway, said valve being biased to assume a closed position with respect to said secondary passageway; and a connection means having an interior cavity with a first port in pressure communication with said wastegate means, whereby the pressure within the cavity is in opposition to the valve bias, a second port adapted to be in pressure communication with the engine air intake manifold, and a third port adapted to be in pressure communication with a pressure responsive control for regulating the fuel flow from an engine fuel pump and the operating speed of the turbine wheel.

7. The turbocharger of claim 6 wherein the pressure communication between the second port of the connection and the engine air intake manifold is provided with an orifice means.

* * * * *